May 2, 1933.   D. D. RANSDELL ET AL   1,907,188
MEANS FOR CONNECTING BRANCHES TO MAINS
Filed Feb. 26, 1931
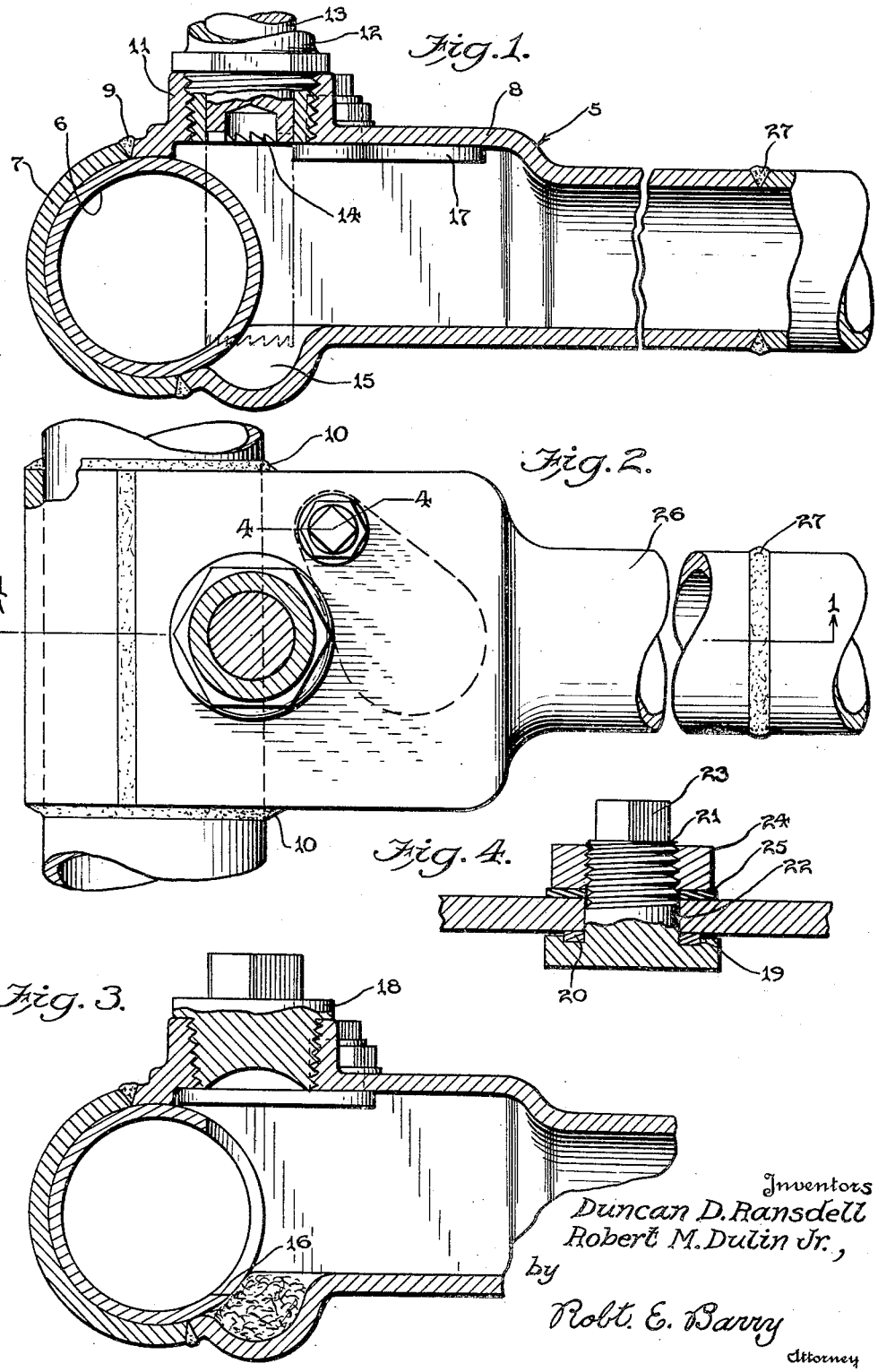
Inventors
Duncan D. Ransdell
Robert M. Dulin Jr.,
by
Robt. E. Barry
Attorney Patented May 2, 1933

1,907,188

UNITED STATES PATENT OFFICE

DUNCAN D. RANSDELL AND ROBERT M. DULIN, JR., OF WASHINGTON, DISTRICT OF COLUMBIA

MEANS FOR CONNECTING BRANCHES TO MAINS

Application filed February 26, 1931. Serial No. 518,531.

This invention relates to improvements in fittings for tapping into a high pressure gas line or the like for the purpose of taking off a lateral branch or the like for residence service and analogous purposes.

Heretofore, in connecting a lateral to a main line, it was generally necessary to plug the main line at two spaced points between which the lateral was to be attached, and to vent from the main line into the atmosphere during the attachment of the lateral. Obviously, this required the cutting off of the flow through the main line during the operation.

It has also been proposed to attach a lateral fitting and to tap through the same into the main line. Afterwards, the tapping tool is removed from the fitting and a valve in the latter is used to cut off the flow through the fitting. Such procedure allowed the tapping of only a small hole in the main line which restricted the gas flow into the lateral, and consequently, it is necessary with such a proposal to attach two or three lateral fittings to the main line and then unite them with a common lateral branch which will receive the gas from these lateral fittings.

The primary object of the invention is to eliminate the above objections and to provide a fitting which may be quickly attached to a gas main at any desired point, without loss of gas or interference with the flow through the main line, and which will form a permanent part of the distribution system after it has been installed.

Another object is to furnish a fitting having its roof provided with a suitable port or nipple for the reception of a boring or tapping tool; such fitting cooperating with a valve positioned within the fitting for closing the port without obstructing the flow through the fitting, and the nipple or port being readily plugged or closed after tapping to insure the prevention of leakage.

With the foregoing objects outlined and with other objects in view which will appear as the description proceeds, the invention consists in the novel features hereinafter described in detail, illustrated in the accompanying drawing, and more particularly pointed out in the appended claims.

In the drawing,

Fig. 1 is a transverse vertical sectional view of a gas main with our improved fitting attached thereto, and showing the parts in the position they occupy when the boring or drilling tool is about to commence the cutting of the main; the section being taken on the line 1—1 of Fig. 2.

Fig. 2 is a plan view of the same elements partly in section to facilitate illustration.

Fig. 3 is a view like Fig. 1, but showing the parts after the main has been tapped, the slide valve closed, and the tapping hole plugged.

Fig. 4 is a vertical sectional view of a detail on the line 4—4 of Fig. 2.

In accordance with our invention, when it is desired to take a branch off from a main line, a fitting 5 is attached directly to the high pressure main 6 before the latter is punctured. For this purpose, the fitting is of sectional form and comprises a semi-cylindrical part 7 and a tubular part 8. Where these parts come together, they are secured to one another by any suitable means such as lines of welding 9. Furthermore, these parts are welded to the main at spaced points by circumferential lines of welding, as shown at 10, and after the connection is made, it will be understood that the interior of the fitting 5 is gas-tight.

For the purpose of attaching a tapping tool to the fitting, the latter has an upstanding nipple 11 forming a port and provided with internal screw threads for attachment to threads at the lower end of the tapping tool guide 12. Any suitable tapping tool may be employed, such as the kind having a rotatable and axially movable stem 13 which terminates in cutting teeth 14. Obviously, as the stem is turned and the teeth move downwardly, the main will be bored, and for the accumulation of the boring chips, the floor of the fitting is provided with a pocket 15 directly below the nipple.

As the stem 13 snugly fits the guide 12, it will be understood that there will be no escape of gas through the tapping tool during the boring operation, and after the desired cut has been made in the main, the boring will be halted, so as to form a dam 16 adjacent to the pocket. This dam will act in a measure to prevent the borings from entering the main.

After the main has been tapped, the boring tool is drawn upwardly to the position shown in Fig. 1, and then a pivoted plate valve 17 which has a swivel connection with the roof of the fitting is swung into position to close the port in the nipple 11. Now the guide 12 of the boring tool may be unscrewed from the nipple without any liability of leakage of gas through the latter. A plug 18 is then screwed into the nipple for permanently sealing the same.

To prevent leakage of gas through the swivel connection of the valve, we prefer to provide the upper surface of the valve with a circular groove 19 to receive a lead gasket 20, and from this portion of the valve, a screw threaded plug 21 projects upwardly through a hole 22 in the roof of the fitting. The upper end of this plug is squared as at 23 to facilitate the turning of the same by a suitable tool, and the plug cooperates with an external lock nut 24 which is threaded on the plug and functions to compress a suitable gasket 25 against the outer surface of the roof of the fitting.

The reduced tubular portion 26 of the fitting may be connected to the branch piping by any suitable means such as a welded joint 27.

While we have illustrated and described the invention in connection with the joining of a lateral branch to a main line, it will be understood that by properly shaping the sections of the fitting, they might be attached to the dead end of a main, so as to run the extension line in the same general direction as the main line.

We also desire to be understood that the invention may be employed wherever it is desired to connect a branch or extension to a pipe transporting any fluid under sub-atmospheric, atmospheric or super-atmospheric pressure.

From the foregoing it is believed that the construction, and advantages of the invention may be readily understood by those skilled in the art, and it is apparent that changes may be made in the details disclosed, without departing from the spirit of the invention, as expressed in the claims.

What is claimed and desired to be secured by Letters Patent is:

1. The combination with a main pipe having an opening in its wall, of a hollow fitting having its interior communicating with said opening and rigidly connected to said pipe, a port in the fitting having its axis arranged tangentially to said pipe, a valve in the fitting for closing the inner end of said port, the fitting being unobstructed by the valve when the latter is closed, and means for actuating the valve from the exterior of the fitting.

2. The combination with a main pipe having an opening in its wall, of a hollow fitting rigidly connected to the pipe and having its interior communicating with said opening, a port in the fitting having its axis arranged tangentially to the pipe, a valve in the fitting positioned in close proximity to the main pipe and closing the inner end of said port, and means for actuating said valve from the exterior of the fitting, said valve having a plane surface slidably engaging the interior of the fitting.

3. The combination with a main pipe having an opening in its wall, of a hollow fitting rigidly connected to the pipe and having its interior in communication with said opening, a port in the fitting having its axis arranged tangentially to said pipe, a valve in the fitting positioned in close proximity to the main pipe and closing the inner end of said port, and means for actuating said valve from the exterior of the fitting, said valve having a plane surface slidably engaging the roof of the fitting.

4. The combination with a main pipe having an opening in its wall, of a hollow fitting rigidly connected to the pipe and having its interior communicating with said opening, a port in the fitting having its axis arranged tangentially to the pipe, a valve in the fitting positioned in close proximity to the main pipe and closing the inner end of said port, and means for actuating said valve from the exterior of the fitting, said valve being of the pivoted plate type and having a plane surface slidably engaging a wall of the fitting.

5. In a structure of the character described, a main line pipe having an opening in its wall, a hollow fitting secured to the pipe in a gas-tight manner and having its interior communicating with said opening, a port in the roof of the fitting having its axis arranged tangentially to said pipe, a pocket in the floor of the fitting directly beneath said port, and movable means closing said port, said main line having a dam wall where the pocket is located.

6. The combination with a main pipe, of a hollow fitting rigidly connected to the same and having a port in its roof, the axis of the port being arranged tangentially to said pipe and the fitting being provided with means for the attachment of a boring tool to the same so that said tool may be inserted through said port for tangentially boring a hole in the wall of the pipe, said hole communicating with the interior of the fitting, a chamber in the fitting into which the port leads, a valve in said chamber for closing the inner end of the port, a lateral branch pipe leading from the chamber, the chamber and branch pipe being unobstructed by the valve when the latter is closed, and means for actuating said valve from the exterior of the fitting.

7. The combination with a main pipe having an opening in its wall, a branch pipe extending radially from the main pipe, a hollow fitting rigidly connected to the main pipe and having a passage disposed radially of the main pipe and directly connecting the latter with the branch pipe, the interior of the fitting communicating with said opening, said fitting having a port lying between the main and branch pipes, and a valve in the fitting for closing said port.

8. The combination with a main line pipe having an opening in its wall, of a tubular fitting formed of sections and having its interior communicating with said opening, means connecting the sections of the fitting and connecting said sections to the pipe in a gas-tight manner, a port in the roof of the fitting having its axis arranged tangentially to the main line pipe, a valve arranged within the fitting closing said port and swiveled to the roof of the fitting, and auxiliary means for closing said port.

In testimony whereof, we hereto affix our signatures.

DUNCAN D. RANSDELL.
ROBERT M. DULIN Jr.